Sept. 4, 1934.    B. A. MALKIN    1,972,848
STEAM JOINT
Filed Nov. 11, 1931
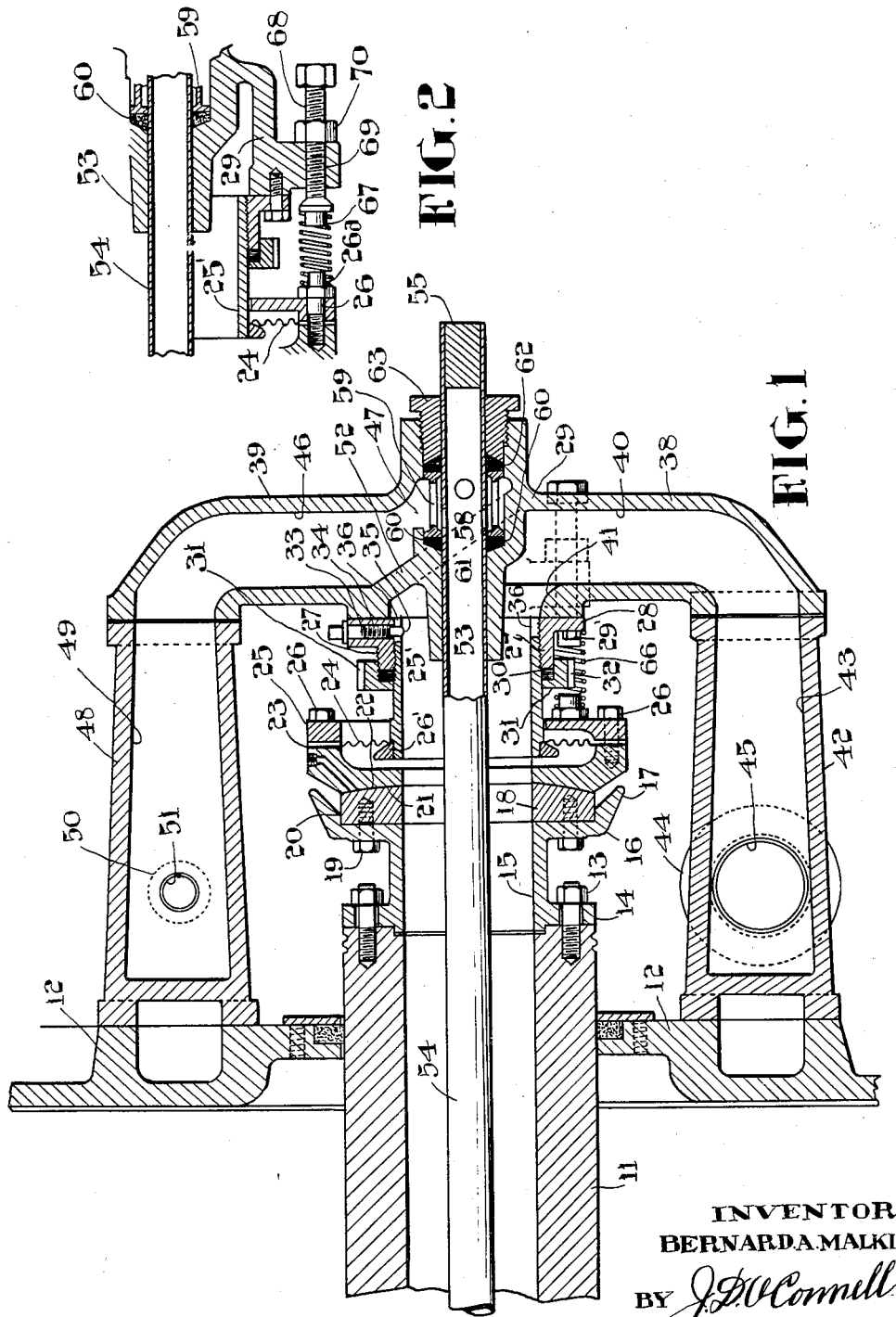
INVENTOR
BERNARD A. MALKIN
BY J. D. O'Connell
ATTORNEY Patented Sept. 4, 1934

1,972,848

UNITED STATES PATENT OFFICE 1,972,848

STEAM JOINT

Bernard A. Malkin, Lachine, Quebec, Canada

Application November 11, 1931, Serial No. 574,298

7 Claims. (Cl. 285—10)

This invention relates to steam joints used in connection with steam heated cylinders employed in the paper making and other industries and has particular reference to an improved steam joint assembly of the kind disclosed in my prior Patent No. 1,859,975, granted May 24, 1932.

The present invention has for one of its objects to provide an improved steam joint assembly in which the main joint casting and the sealing rings and other elements interposed between the casting and the end of the cylinder journal are removable without disturbing the mounting of the steam supply and drain pipes to which the main joint casting is ordinarily connected.

Another object is to provide an improved steam joint assembly or connection which will last for a longer period than the connections now in use and which is of comparatively simple and inexpensive construction.

Proceeding now to a more detailed discussion of the invention reference will be had to the accompanying drawing, wherein—

Figure 1 is a horizontal section through a steam joint assembly provided in accordance with this invention. In this view the steam joint assembly is shown applied to a cylinder journal appearing in section.

Figure 2 is a sectional detail showing the relative arrangement of certain portions of the steam joint assembly.

Referring more particularly to the drawing, 11 designates the journal of a steam heated cylinder and 12 a portion of the bearing in which the journal is mounted to rotate. The end of the journal is fastened by bolts 13 to a flange 14 formed at the inner end of a tubular fitting 15. A flange 16 is also formed at the outer end of the fitting 15 and is provided with an annular rim 17 within which is arranged a sealing ring 18, said sealing ring being fastened to the flange by bolts 19 and having its outer periphery engaging an inner shoulder 20 formed at the base of the rim 17. The ring 18 at the side remote from the flange 16 is provided with a face 21 engaging the complementary face 22 of a co-operating sealing ring 23, said faces 21 and 22 being transversely shaped so that relative movement of the faces will not break the seal therebetween. A flexible diaphragm 24 is arranged in a plane perpendicular to the central axis of the ring 23 and has its outer edge portion clamped to said ring by means of the clamping ring 25 and the fastening bolts 26. The inner edge of the diaphragm 24 is clamped to the inner end of a sleeve 25' by means of a clamping annulus 26' welded or otherwise secured to said sleeve. The outer end of sleeve 25' is threadedly engaged in a collar 27 having a base flange 28 fastened to the main joint casting 29 by means of cap screws 29' or other suitable fastening means. Leakage between the sleeve 25' and the collar 27 is prevented by means of suitable packing 30 interposed between the end of the collar and a gland nut 31. The gland nut 31 is in threaded engagement with the collar, as shown, and is provided with suitable notches 32 to facilitate turning of the nut by means of a spanner or other suitable tool. In order to prevent accidental turning of the sleeve 25' within the collar 27, a bolt 33 is threaded through an opening 34 formed in the collar and is provided with a pin projection 35 adapted to engage in one of a plurality of slots 36 formed in the outer end of the sleeve. The joint casting 29 is provided with a pair of laterally projecting hollow arms 38 and 39 cast integral therewith. The arm 38 affords a steam passage 40 having its inner end communicating with the sleeve 25' through the medium of a suitable opening 41 formed in the inner wall of the casting. The free end of the arm 38 is bolted or detachably secured in any suitable manner to the outer end of a tubular steam supply fitting 42 having its inner end bolted or otherwise secured to the bearing 12. The fitting 42 affords a steam supply passage 43 placing the previously mentioned passage 40 in communication with a steam supply pipe 44, the upper end of said pipe being suitably secured to a steam inlet opening 45 formed in the lower wall portion of the fitting 42.

The remaining arm 39 of the main joint casting affords a condensate outlet passage 46 having one end communicating with a chamber 47 provided in the central portion of the casting 29. The free end of the arm 39 is bolted or otherwise secured to the outer end of a condensate drain fitting 48, the inner end of which is bolted or otherwise fastened to the bearing 12. This fitting 48 provides a condensate outlet passage 49 placing the passage 46 in communication with a condensate drain pipe 50, the upper end of said pipe being suitably connected to an outlet opening 51 formed in the lower wall portion of the fitting.

The chamber 47 formed in the central portion of the joint casting 29 is separated from the passage 40 by means of an inclined partition wall 52 which is formed to provide a bearing 53 through which extends the outer portion of the usual condensate siphon 54. The siphon 54 is of ordinary construction consisting of a tube passing through the journal 11 and having its inner end disposed in proximity to the inner wall surface of the steam heated cylinder of which the journal forms a part. In the present instance the outer end of the siphon 54 is shown closed by a plug 55. It may also be mentioned here that the outer end of the siphon 54 may be equipped with any suitable means for turning the siphon in its bearing 53 so as to adjust the position of the inner end of the siphon, an example of such means being disclosed in my prior application previously referred to.

The siphon 54 is provided with openings 58 through which the condensate entering said siphon is drawn into the chamber 47 and from thence through the passages 46 and 49 to the condensate discharge pipe 50. The portion of the siphon in which the openings 58 are formed is surrounded by a cage 59 having its inner end bearing against a packing 60 interposed between said end and a shoulder 61 formed at the inner end of the siphon bearing 53. A similar packing 62 is interposed between the outer end of the cage and the inner end of a gland nut 63 which forms the outer wall of the chamber 47 and also provides a bearing for the siphon 54.

The engaging surfaces of the sealing rings 21 and 22 are resiliently pressed together by a series of springs, one of which is indicated at 66. Each spring is arranged with its inner end embracing a stud 26a carried by one of the bolts 26 and its outer end embracing a similar stud 67 carried by the inner end of an adjusting bolt 68. The bolts 68 are threaded through suitable bores 69 formed in portions of the casting 29 and are equipped with locking nuts 70.

The steam joint connection described in the foregoing has several advantages as compared with the connections previously used. The perpendicular arrangement of the diaphragm 24 with respect to the fitting 15 and the sleeve 25' and the manner of connecting the diaphragm to the sleeve and to the sealing ring 23 provides a joint connection which is satisfactory in service and will last for a considerably longer period of time than the tubular expansion diaphragms heretofore employed between the stationary and movable parts of the steam connections. The provision of the steam supply fitting 42 and the condensate outlet 48 to which the arms 38 and 39 and the main joint casting are bolted as herein described also constitutes an improved feature of construction, in that it permits the main casting 29 and the parts interposed between the casting and the journal end to be readily removed without disturbing the mounting of the steam supply pipe 44 and the condensate outlet pipe 50, this removal being accomplished by detaching the arms 38 and 39 from the fittings 42 and 48 thereby permitting the casting 29, together with the sealing rings and associated elements to be dismounted while leaving the fittings 42 and 48 in place. Moreover, the attachment of the steam supply and condensate pipes to the casting solidly bolted to the frame work of the machine is of advantage in that stress on the steam joint connection due to the weight or expansion or contraction of said pipes is reduced to a minimum.

Having thus fully outlined what I now conceive to be the preferred embodiment of my invention, it will be understood that various modifications may be resorted to within the scope and spirit of the appended claims.

Having thus described my invention what I claim is:—

1. The combination of a rotatably mounted hollow journal, a hollow steam fitting positioned at one side of said journal, a hollow condensate fitting positioned at the opposite side of said journal, a steam supply pipe connected to the first mentioned fitting, a condensate return pipe connected to the remaining fitting, a casting spaced from one end of the journal and detachably supported by said fittings so as to be removable without disturbing the mounting of the fittings or the pipes connected thereto, said casting having passages formed therein including a steam inlet passage communicating at its outer end with said steam fitting and a condensate discharge passage communicating at its outer end with said condensate fitting, an expansible steam tight connection between the casting and the journal affording a conduit placing the inner end of said steam passage in communication with the interior of the journal, said connection being designed to permit rotation of the journal with respect to said casting, and a condensate siphon extending from the casting to the interior of the journal, the outer portion of said siphon being in communication with the inner end of said condensate discharge passage.

2. The combination of a hollow rotary journal, a bearing supporting said journal, a pair of hollow fittings extending outwardly from the bearing, a steam supply pipe connected to one of said fittings, a condensate return pipe connected to the remaining fitting, a casting presenting a pair of hollow arms detachably joined to the outer ends of said fittings, an expansible seal connection between the casting and the end of the journal affording a conduit for conducting steam from one of said arms to the interior of the journal, and a condensate siphon passing through said journal and conduit and provided with an outlet communicating with the remaining hollow arm of said casting.

3. The combination of a hollow rotary journal, a bearing supporting said journal, a pair of horizontally disposed tubular fittings positioned at opposite sides of said journal, each fitting having one end attached to said bearing, a steam supply pipe connected to one of said fittings, a condensate discharge pipe connected to the remaining fitting, a casting presenting a pair of laterally directed hollow arms detachably joined to the outer ends of said fittings so that the central portion of the casting is supported opposite to and in spaced relation to the end of the journal, said central portion of the casting being apertured to provide a condensate inlet at the inner end of one of said arms and a steam inlet at the inner end of the remaining arm, an expansible seal connection between the casting and the end of the journal affording a conduit for conducting steam from the last mentioned arm to the interior of the journal and means for conducting condensate from the interior of the journal to the condensate inlet at the inner end of the remaining arm.

4. The combination of a hollow rotary journal, a casting supported in spaced relation to one end of said journal, said casting having a steam passage formed therein, means for supplying steam to said passage and an expansible seal connection between the casting and the journal forming a conduit placing said passage in communication with the interior of the journal, said connection comprising a sealing ring supported by the end of the journal, a sleeve projecting from said casting and forming a continuation of said steam passage, a ring shaped diaphragm disposed in a plane perpendicular to the longitudinal axis of the sleeve and having its inner edge secured thereto and a second sealing ring secured to the outer edge of the diaphragm and disposed in frictional contact with the first mentioned sealing ring and means for resiliently pressing said rings together.

5. The combination of a hollow rotary journal, a stationary sleeve positioned opposite one end of said journal in axial alignment therewith, a sealing ring supported by the said end of the journal, a ring-shaped diaphragm disposed in a plane perpendicular to the axis of the sleeve and having its inner edge secured to the end of the sleeve nearest the journal, a second sealing ring secured to the outer edge of said diaphragm and disposed in frictional contact with the first mentioned sealing ring and a supporting casting to which the remaining end of said sleeve is attached, said casting being provided with a steam passage communicating with said sleeve.

6. The combination of a hollow rotary journal, a stationary sleeve positioned opposite one end of the journal in axial alignment therewith, a sealing ring supported by the said end of the journal, a ring-shaped diaphragm disposed in a plane perpendicular to the axis of the sleeve and having its inner edge secured to the end of the sleeve nearest the journal, a second sealing ring secured to the outer edge of said diaphragm and disposed in frictional contact with the first mentioned sealing ring, and a supporting casting to which the opposite end of the sleeve is adjustably connected to permit of axial adjustment of the sleeve with respect to said casting, said casting being provided with a steam passage communicating with said sleeve.

7. The combination of a hollow rotary journal, a stationary sleeve positioned opposite one end of the journal in axial alignment therewith, and an expansible steam pipe connection between the adjacent ends of the journal and the sleeve affording a conduit placing the sleeve in communication with the interior of the journal, said connection comprising a sealing ring supported by one end of the journal, a ring-shaped diaphragm disposed in a plane perpendicular to the longitudinal axis of the sleeve and having its inner edge secured thereto, a second sealing ring disposed in frictional contact with the first mentioned sealing ring and having a diameter considerably greater than the diameter of said sleeve, and means clamping the outer edge portion of the second sealing ring to the outer edge of said diaphragm.

BERNARD A. MALKIN.